United States Patent
Whitehead et al.

(10) Patent No.: US 8,138,970 B2
(45) Date of Patent: Mar. 20, 2012

(54) GNSS-BASED TRACKING OF FIXED OR SLOW-MOVING STRUCTURES

(75) Inventors: Michael L. Whitehead, Scottsdale, AZ (US); Walter J. Feller, Airdrie (CA)

(73) Assignee: Hemisphere GPS LLC, Calgary, Alberta (CA)

( * ) Notice: Subject to any disclaimer, the term of this patent is extended or adjusted under 35 U.S.C. 154(b) by 268 days.

(21) Appl. No.: 12/683,994

(22) Filed: Jan. 7, 2010

(65) Prior Publication Data

US 2010/0109944 A1    May 6, 2010

Related U.S. Application Data

(63) Continuation-in-part of application No. 12/554,741, filed on Sep. 4, 2009, and a continuation-in-part of application No. 12/350,431, filed on Jan. 8, 2009, which is a continuation-in-part of application No. 10/804,758, filed on Mar. 19, 2004, now Pat. No. 7,400,956, and a continuation-in-part of application No. 10/828,745, filed on Apr. 21, 2004, now abandoned.

(60) Provisional application No. 60/464,756, filed on Apr. 23, 2003, provisional application No. 60/456,146, filed on Mar. 20, 2003.

(51) Int. Cl.
*G01S 19/44* (2010.01)
*G01S 19/51* (2010.01)
*G01S 19/53* (2010.01)

(52) U.S. Cl. .......... 342/357.27; 342/357.34; 342/357.36

(58) Field of Classification Search ............. 342/357.26, 342/357.27, 357.34, 357.36
See application file for complete search history.

(56) References Cited

U.S. PATENT DOCUMENTS

| | | | |
|---|---|---|---|
| 3,585,537 A | 6/1971 | Rennick et al. | |
| 3,596,228 A | 7/1971 | Reed, Jr. et al. | |
| 3,727,710 A | 4/1973 | Sanders et al. | |
| 3,815,272 A | 6/1974 | Marleau | |
| 3,899,028 A | 8/1975 | Morris et al. | |
| 3,987,456 A | 10/1976 | Gelin | |
| 4,132,272 A | 1/1979 | Holloway et al. | |
| 4,170,776 A * | 10/1979 | Frosch et al. | 342/458 |

(Continued)

FOREIGN PATENT DOCUMENTS

WO    WO-9836288    8/1998

(Continued)

OTHER PUBLICATIONS

"International Search Report", PCT/US09/067693, (Jan. 26, 2010).

(Continued)

*Primary Examiner* — Gregory C Issing
(74) *Attorney, Agent, or Firm* — Law Office of Mark Brown LLC; Mark E. Brown

(57) ABSTRACT

A multi-antenna GNSS system and method provide earth-referenced GNSS heading and position solutions. The system and method compensate for partial blocking of the antennas by using a known attitude or orientation of the structure, which can be determined by an orientation device or with GNSS measurements. Multiple receiver units can optionally be provided and can share a common clock signal for processing multiple GNSS signals in unison. The system can optionally be installed on fixed or slow-moving structures, such as dams and marine vessels, and on mobile structures such as terrestrial vehicles and aircraft.

2 Claims, 9 Drawing Sheets

L1 RTK W/ MULTI ANT

U.S. PATENT DOCUMENTS

| | | |
|---|---|---|
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A * | 4/1993 | Geier ............................ 701/215 |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen et al. |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cozenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A * | 8/1999 | Tang et al. ............... 342/357.37 |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller et al. |
| 6,014,101 A | 1/2000 | Loomis |
| 6,014,608 A | 1/2000 | Seo |
| 6,018,313 A | 1/2000 | Englemayer et al. |
| 6,023,239 A | 2/2000 | Kovach |
| 6,052,647 A * | 4/2000 | Parkinson et al. ............. 701/215 |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |
| 6,069,583 A | 5/2000 | Silvestrin et al. |
| 6,076,612 A | 6/2000 | Carr et al. |

| | | | | | | |
|---|---|---|---|---|---|---|
| 6,081,171 | A | 6/2000 | Ella | 6,774,843 | B2 | 8/2004 | Takahashi |
| 6,100,842 | A | 8/2000 | Dreier et al. | 6,792,380 | B2 | 9/2004 | Toda |
| 6,122,595 | A | 9/2000 | Varley et al. | 6,819,269 | B2 | 11/2004 | Flick |
| 6,128,574 | A | 10/2000 | Diekhans | 6,822,314 | B2 | 11/2004 | Beasom |
| 6,144,335 | A | 11/2000 | Rogers | 6,865,465 | B2 | 3/2005 | McClure |
| 6,191,730 | B1 | 2/2001 | Nelson, Jr. | 6,865,484 | B2 | 3/2005 | Miyasaka et al. |
| 6,191,733 | B1 | 2/2001 | Dizchavez | 6,882,312 | B1 * | 4/2005 | Vorobiev et al. ............... 342/374 |
| 6,198,430 | B1 | 3/2001 | Hwang et al. | 6,900,992 | B2 | 5/2005 | Kelly et al. |
| 6,198,992 | B1 | 3/2001 | Winslow | 6,922,635 | B2 | 7/2005 | Rorabaugh |
| 6,199,000 | B1 | 3/2001 | Keller et al. | 6,931,233 | B1 | 8/2005 | Tso et al. |
| 6,205,401 | B1 | 3/2001 | Pickhard et al. | 6,967,538 | B2 | 11/2005 | Woo |
| 6,211,821 | B1 * | 4/2001 | Ford ........................ 342/357.36 | 6,990,399 | B2 | 1/2006 | Hrazdera et al. |
| 6,215,828 | B1 | 4/2001 | Signell et al. | 7,006,032 | B2 | 2/2006 | King et al. |
| 6,229,479 | B1 | 5/2001 | Kozlov et al. | 7,026,982 | B2 | 4/2006 | Toda et al. |
| 6,230,097 | B1 | 5/2001 | Dance et al. | 7,027,918 | B2 * | 4/2006 | Zimmerman et al. ........ 701/213 |
| 6,233,511 | B1 | 5/2001 | Berger et al. | 7,031,725 | B2 | 4/2006 | Rorabaugh |
| 6,236,916 | B1 | 5/2001 | Staub et al. | 7,089,099 | B2 | 8/2006 | Shostak et al. |
| 6,236,924 | B1 | 5/2001 | Motz | 7,142,956 | B2 | 11/2006 | Heiniger et al. |
| 6,253,160 | B1 | 6/2001 | Hanseder | 7,162,348 | B2 | 1/2007 | McClure et al. |
| 6,256,583 | B1 | 7/2001 | Sutton | 7,191,061 | B2 | 3/2007 | McKay et al. |
| 6,259,398 | B1 | 7/2001 | Riley | 7,231,290 | B2 | 6/2007 | Steichen et al. |
| 6,266,595 | B1 | 7/2001 | Greatline et al. | 7,248,211 | B2 * | 7/2007 | Hatch et al. ............... 342/357.31 |
| 6,285,320 | B1 | 9/2001 | Olster et al. | 7,271,766 | B2 | 9/2007 | Zimmerman et al. |
| 6,292,132 | B1 | 9/2001 | Wilson | 7,277,784 | B2 | 10/2007 | Weiss |
| 6,307,505 | B1 | 10/2001 | Green | 7,292,186 | B2 | 11/2007 | Miller et al. |
| 6,313,788 | B1 | 11/2001 | Wilson | 7,324,915 | B2 | 1/2008 | Altman |
| 6,314,348 | B1 | 11/2001 | Winslow | 7,358,896 | B2 | 4/2008 | Gradincic et al. |
| 6,325,684 | B1 | 12/2001 | Knight | 7,373,231 | B2 | 5/2008 | McClure et al. |
| 6,336,066 | B1 | 1/2002 | Pellenc et al. | 7,388,539 | B2 | 6/2008 | Whitehead et al. |
| 6,345,231 | B2 | 2/2002 | Quincke | 7,395,769 | B2 | 7/2008 | Jensen |
| 6,356,602 | B1 | 3/2002 | Rodal et al. | 7,428,259 | B2 | 9/2008 | Wang et al. |
| 6,377,889 | B1 | 4/2002 | Soest | 7,437,230 | B2 | 10/2008 | McClure et al. |
| 6,380,888 | B1 | 4/2002 | Kucik | 7,451,030 | B2 | 11/2008 | Eglington et al. |
| 6,389,345 | B2 | 5/2002 | Phelps | 7,479,900 | B2 | 1/2009 | Horstemeyer |
| 6,392,589 | B1 | 5/2002 | Rogers et al. | 7,489,270 | B2 * | 2/2009 | Lawrence et al. ........ 342/357.29 |
| 6,397,147 | B1 | 5/2002 | Whitehead | 7,505,848 | B2 | 3/2009 | Flann et al. |
| 6,415,229 | B1 | 7/2002 | Diekhans | 7,522,100 | B2 | 4/2009 | Yang et al. |
| 6,418,031 | B1 | 7/2002 | Archambeault | 7,571,029 | B2 | 8/2009 | Dai et al. |
| 6,421,003 | B1 | 7/2002 | Riley et al. | 7,689,354 | B2 | 3/2010 | Heiniger et al. |
| 6,424,915 | B1 | 7/2002 | Fukuda et al. | 2003/0014171 | A1 | 1/2003 | Ma et al. |
| 6,431,576 | B1 | 8/2002 | Viaud et al. | 2003/0187560 | A1 * | 10/2003 | Keller et al. ................... 701/50 |
| 6,434,462 | B1 | 8/2002 | Bevly et al. | 2003/0208319 | A1 | 11/2003 | Ell et al. |
| 6,445,983 | B1 | 9/2002 | Dickson et al. | 2004/0039514 | A1 | 2/2004 | Steichen et al. |
| 6,445,990 | B1 | 9/2002 | Manring | 2004/0212533 | A1 | 10/2004 | Whitehead et al. |
| 6,449,558 | B1 | 9/2002 | Small | 2005/0080559 | A1 | 4/2005 | Ishibashi et al. |
| 6,463,091 | B1 | 10/2002 | Zhodzicshsky et al. | 2005/0225955 | A1 | 10/2005 | Grebenkemper et al. |
| 6,463,374 | B1 | 10/2002 | Keller et al. | 2005/0242991 | A1 * | 11/2005 | Montgomery et al. .. 342/357.14 |
| 6,466,871 | B1 | 10/2002 | Reisman et al. | 2005/0265494 | A1 | 12/2005 | Goodlings |
| 6,469,663 | B1 | 10/2002 | Whitehead et al. | 2006/0167600 | A1 | 7/2006 | Nelson et al. |
| 6,484,097 | B2 | 11/2002 | Fuchs et al. | 2006/0215739 | A1 | 9/2006 | Williamson et al. |
| 6,501,422 | B1 | 12/2002 | Nichols | 2007/0078570 | A1 | 4/2007 | Dai et al. |
| 6,515,619 | B1 | 2/2003 | McKay, Jr. | 2007/0088447 | A1 | 4/2007 | Stothert et al. |
| 6,516,271 | B2 | 2/2003 | Upadhyaya et al. | 2007/0121708 | A1 | 5/2007 | Simpson |
| 6,539,303 | B2 | 3/2003 | McClure et al. | 2007/0205940 | A1 | 9/2007 | Yang et al. |
| 6,542,077 | B2 | 4/2003 | Joao | 2007/0285308 | A1 | 12/2007 | Bauregger et al. |
| 6,549,835 | B2 | 4/2003 | Deguchi | 2008/0129586 | A1 | 6/2008 | Martin |
| 6,553,299 | B1 | 4/2003 | Keller et al. | 2008/0204312 | A1 | 8/2008 | Euler |
| 6,553,300 | B2 | 4/2003 | Ma et al. | 2009/0171583 | A1 | 7/2009 | DiEsposti |
| 6,553,311 | B2 | 4/2003 | Ahearn et al. | 2009/0174587 | A1 | 7/2009 | Ogawa et al. |
| 6,570,534 | B2 | 5/2003 | Cohen et al. | 2009/0174622 | A1 | 7/2009 | Kanou |
| 6,577,952 | B2 | 6/2003 | Geier et al. | 2009/0177395 | A1 | 7/2009 | Stelpstra |
| 6,587,761 | B2 | 7/2003 | Kumar | 2009/0177399 | A1 | 7/2009 | Park et al. |
| 6,606,542 | B2 | 8/2003 | Hauwiller et al. | 2009/0259397 | A1 | 10/2009 | Stanton |
| 6,611,228 | B2 | 8/2003 | Toda et al. | 2009/0259707 | A1 | 10/2009 | Martin et al. |
| 6,611,754 | B2 | 8/2003 | Klein | 2009/0262014 | A1 | 10/2009 | DiEsposti |
| 6,611,755 | B1 | 8/2003 | Coffee et al. | 2009/0262018 | A1 | 10/2009 | Vasilyev et al. |
| 6,622,091 | B2 | 9/2003 | Perlmutter et al. | 2009/0262974 | A1 | 10/2009 | Lithopoulos |
| 6,631,916 | B1 | 10/2003 | Miller | 2009/0265054 | A1 | 10/2009 | Basnayake |
| 6,643,576 | B1 | 11/2003 | O'Connor et al. | 2009/0265101 | A1 | 10/2009 | Jow |
| 6,646,603 | B2 | 11/2003 | Dooley et al. | 2009/0265104 | A1 | 10/2009 | Shroff |
| 6,657,875 | B1 | 12/2003 | Zeng et al. | 2009/0273372 | A1 | 11/2009 | Brenner |
| 6,671,587 | B2 | 12/2003 | Hrovat et al. | 2009/0273513 | A1 | 11/2009 | Huang |
| 6,688,403 | B2 | 2/2004 | Bernhardt et al. | 2009/0274079 | A1 | 11/2009 | Bhatia et al. |
| 6,703,973 | B1 | 3/2004 | Nichols | 2009/0274113 | A1 | 11/2009 | Katz |
| 6,711,501 | B2 | 3/2004 | McClure et al. | 2009/0276155 | A1 | 11/2009 | Jeerage et al. |
| 6,721,638 | B2 | 4/2004 | Zeitler | 2009/0295633 | A1 | 12/2009 | Pinto et al. |
| 6,732,024 | B2 | 5/2004 | Wilhelm Rekow et al. | 2009/0295634 | A1 | 12/2009 | Yu et al. |
| 6,744,404 | B1 | 6/2004 | Whitehead et al. | 2009/0299550 | A1 | 12/2009 | Baker |
| 6,754,584 | B2 | 6/2004 | Pinto et al. | 2009/0322597 | A1 | 12/2009 | Medina Herrero et al. |

| | | | |
|---|---|---|---|
| 2009/0322598 | A1 | 12/2009 | Fly et al. |
| 2009/0322600 | A1 | 12/2009 | Whitehead et al. |
| 2009/0322601 | A1 | 12/2009 | Ladd et al. |
| 2009/0322606 | A1 | 12/2009 | Gronemeyer |
| 2009/0326809 | A1 | 12/2009 | Colley et al. |
| 2010/0013703 | A1 | 1/2010 | Tekawy et al. |
| 2010/0026569 | A1 | 2/2010 | Amidi |
| 2010/0030470 | A1 | 2/2010 | Wang et al. |
| 2010/0039316 | A1 | 2/2010 | Gronemeyer et al. |
| 2010/0039318 | A1 | 2/2010 | Kmiecik et al. |
| 2010/0039320 | A1 | 2/2010 | Boyer et al. |
| 2010/0039321 | A1 | 2/2010 | Abraham |
| 2010/0060518 | A1 | 3/2010 | Bar-Sever et al. |
| 2010/0063649 | A1 | 3/2010 | Wu et al. |
| 2010/0084147 | A1 | 4/2010 | Aral |
| 2010/0085249 | A1 | 4/2010 | Ferguson et al. |
| 2010/0085253 | A1 | 4/2010 | Ferguson et al. |
| 2010/0103033 | A1 | 4/2010 | Roh |
| 2010/0103034 | A1 | 4/2010 | Tobe et al. |
| 2010/0103038 | A1 | 4/2010 | Yeh et al. |
| 2010/0103040 | A1 | 4/2010 | Broadbent |
| 2010/0106414 | A1 | 4/2010 | Whitehead |
| 2010/0106445 | A1 | 4/2010 | Kondoh |
| 2010/0109944 | A1 | 5/2010 | Whitehead et al. |
| 2010/0109945 | A1 | 5/2010 | Roh |
| 2010/0109947 | A1 | 5/2010 | Rintanen |
| 2010/0109948 | A1 | 5/2010 | Razoumov et al. |
| 2010/0109950 | A1 | 5/2010 | Roh |
| 2010/0111372 | A1 | 5/2010 | Zheng et al. |
| 2010/0114483 | A1 | 5/2010 | Heo et al. |
| 2010/0117894 | A1 | 5/2010 | Velde et al. |

FOREIGN PATENT DOCUMENTS

| | | |
|---|---|---|
| WO | WO0024239 | 5/2000 |
| WO | WO-03019430 | 3/2003 |
| WO | WO-2005/119386 | 12/2005 |
| WO | WO-2009/066183 | 5/2009 |
| WO | WO-2009126587 | 10/2009 |
| WO | WO-2009/148638 | 12/2009 |

OTHER PUBLICATIONS

Rho, Hyundho et al., "Dual-Frequency GPS Precise Point Positioning with WADGPS Corrections", [retrieved on May 18, 2010]. Retrieved from the Internet: ,URL: http://gauss.gge.unb.ca/papers.pdf/iongnss2005.rho.wadgps.pdf, (Jul. 12, 2006).

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>, (Dec. 7, 2004), p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf, (Dec. 7, 2004), p. 168 para [0001].

Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>, (May 8, 2006).

"International Search Report", PCT/US10/26509, (Apr. 20, 2010).

Parkinson, Bradford W., et al., "Global Positioning System: Theory and Applications, vol. II", Bradford W. Parkinson and Jame J. Spiker, Jr., eds., *Global Positioning System: Theory and Applications*. vol. II, 1995, AIAA, Reston, VA, USA, pp. 3-50, (1995),3-50.

"Orthman Manufacturing Co., www.orthman.com/htm;guidance.htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers vol. 1, Monetrey, California American Institute of Aeronautics and Astronautics, Inc.*, (May 2004),136-143.

Xi, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)* (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE*, Jul. 29-31, 1998, Chiba, 1115-1120.

Last, J. D., et al., "Effect of skywave interference on coverage of radiobeacon DGPS stations", *IEEE Proc. Radar, Sonar Navig.*, vol. 144, No. 3, Jun. 1997, pp. 163-168.

"International Search Report and Written Opinion", PCT/US2004/015678, filed May 17, 2004, Jun. 21, 2005.

"ISO"*11783 Part 7 Draft Amendment 1 Annex, Paragraphs B.6 and B.7.ISO 11783-7.2004 DAM1, ISO*: Mar. 8, 2004.

Kaplan, E D., "Understanding GPS: Principles and Applications", *Artech House*, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles", *ION 55th Annual Meeting*, Jun. 28-30, 1999: Cambridge, Massachusetts; pp. 497-504.

Keicher, R. et al., "Automatic Guidance for Agricultural Vehicles in Europe", *Computers and Electronics in Agriculture*, vol. 25, (Jan. 2000),169-194.

Takac, Frank et al., "SmartRTK: A Novel Method of Processing Standardised RTCM Network RTK Information for High Precision Positioning", *Proceedings of ENC GNSS 2008*, Toulouse, France,(Apr. 22, 2008).

"International Search Report", PCT/US09/33567, (Feb. 9, 2009).

"International Search Report", PCT/US09/49776, (Aug. 11, 2009).

"International Search Report", PCT/AU/2008/000002, (Feb. 28, 2008).

"International Search Report and Written Opinion", PCT/IB2008/003796, (Jul. 15, 2009).

"International Search Report", PCT/US09/33693, (Mar. 30, 2009).

"International Search Report", PCT/US09/039686, (May 26, 2009).

"International Search Report,", PCT/US09/34376, (Nov. 2, 2009).

"International Search Report / Written Opinion", PCT/US09/63594, (Jan. 11, 2010).

"International Search Report", PCT/US09/60668, (Dec. 9, 2009).

"International Search Report and Written Opinion", PCT/US10/21334, (Mar. 12, 2010).

\* cited by examiner

L1 RTK W/ MULTI ANT

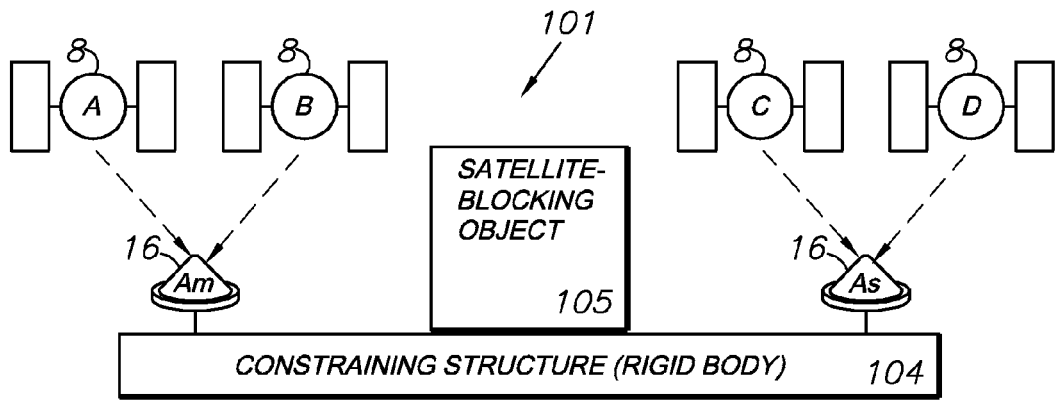
FIG. 5A COMMON/SYNCH CLOCK(S) ORIENTATION DEVICE
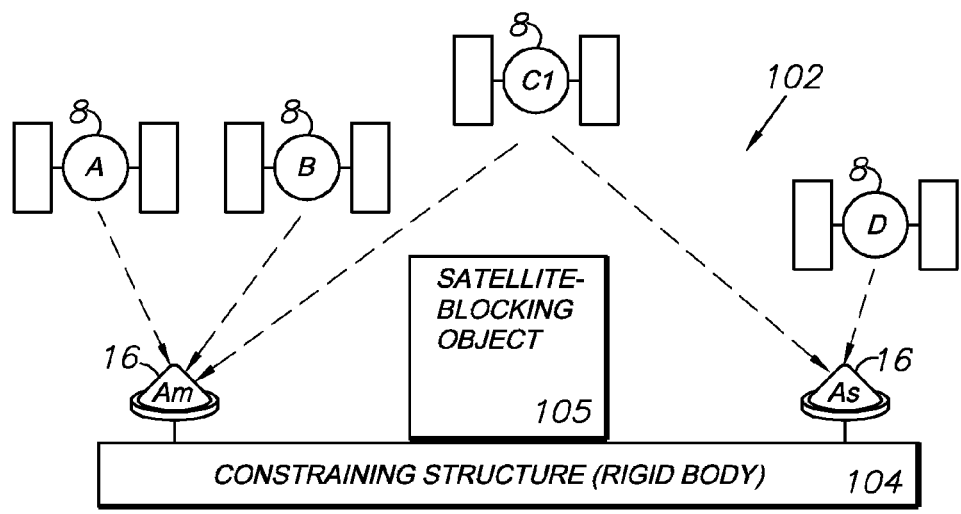
FIG. 5B UNKNOWN CLOCK BIAS ORIENTATION DEVICE

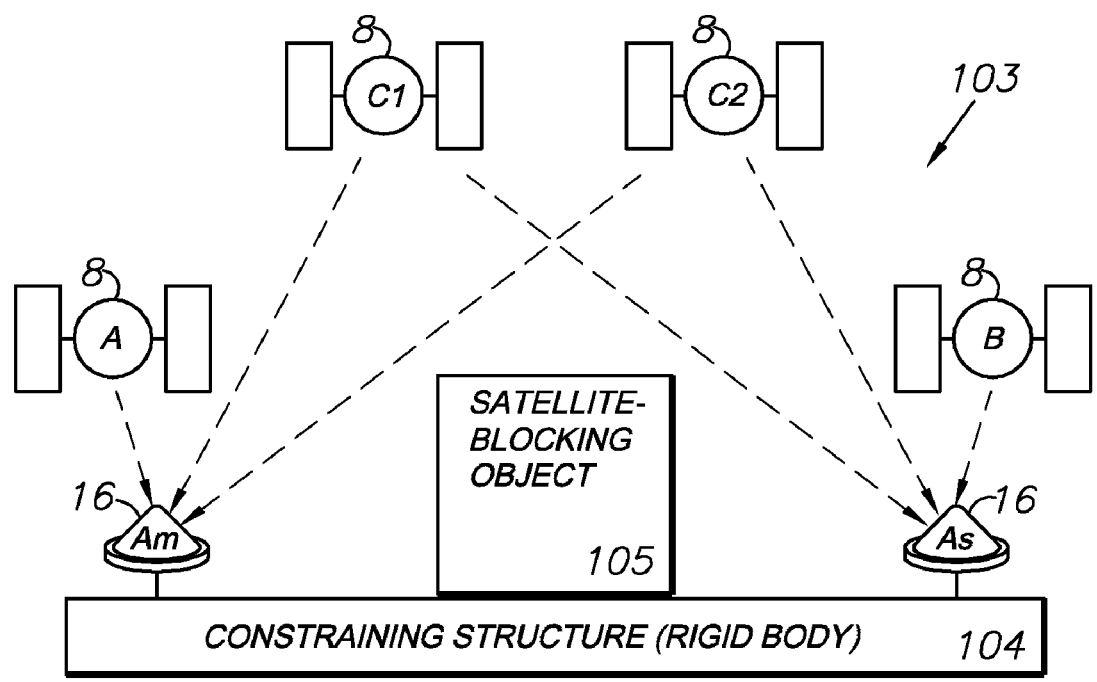
FIG. 5C COMMON/SYNCH CLOCK(S)
GNSS-DERIVED ATTITUDE

GNSS-BASED TRACKING OF FIXED OR SLOW-MOVING STRUCTURES

CROSS-REFERENCE TO RELATED APPLICATIONS

This application is a continuation-in-part of and claims the benefit of: U.S. patent application Ser. No. 12/554,741 filed Sep. 4, 2009; U.S. patent application Ser. No. 12/350,431 filed Jan. 8, 2009; which is a continuation-in-part of U.S. application Ser. No. 10/828,745 filed Apr. 21, 2004 now abandoned; U.S. patent application Ser. No. 10/804,758 filed Mar. 19, 2004, now U.S. Pat. No. 7,400,956; and claims the benefit of U.S. Provisional Patent Applications No. 60/464,756 filed Apr. 23, 2003 and No. 60/456,146 filed Mar. 20, 2003. The contents of all of the aforementioned applications and patent are incorporated by reference herein in their entireties.

BACKGROUND OF THE INVENTION

The invention relates generally to Global Navigation Satellite System (GNSS) receivers and more particularly to a method and an apparatus for computing multiple precise locations using differential carrier phases of a GNSS satellite signal by synchronizing the clocks between the master receiver and the slave receiver for tracking fixed and slow-moving objects. It further describes a technique of connecting a plurality of antennas to the slave receiver, which can be switched on to measure each antenna's relative location to the master antenna for monitoring long-term deformation.

GNSS Background

GNSS includes the Global Positioning System (GPS), which was established by the United States government and employs a constellation of 24 or more satellites in well-defined orbits at an altitude of approximately 26,500 km. These satellites continually transmit microwave L-band radio signals in two frequency bands, centered at 1575.42 MHz and 1227.6 MHz, denoted as L1 and L2 respectively. These signals include timing patterns relative to the satellite's onboard precision clock (which is kept synchronized by a ground station) as well as a navigation message giving the precise orbital positions of the satellites. GPS receivers process the radio signals, compute ranges to the GPS satellites, and by triangulating these ranges, the GPS receiver determines its position and its internal clock error. Different levels of accuracies can be achieved depending on the techniques deployed. This invention specifically targets the sub-centimeter accuracies achievable on a remote and possibly mobile GPS receiver by processing carrier phase observations both from the remote receiver and from one or more fixed-position reference stations. This procedure is often referred to as Real Time Kinematic or RTK.

To gain a better understanding of the accuracy levels achievable by using the GPS system, it is necessary to understand the two types of signals available from the GPS satellites. The first type of signal includes both the Coarse Acquisition (C/A), which modulates the L1 radio signal and precision (P) code, which modulates both the L1 and L2 radio signals. These are pseudorandom digital codes that provide a known pattern that can be compared to the receiver's version of that pattern. By measuring the time-shift required to align the pseudorandom digital codes, the GPS receiver is able to compute an unambiguous pseudo-range to the satellite. Both the C/A and P codes have a relatively long "wavelength," of about 300 meters (1 microsecond) and 30 meters (0.1 microsecond), respectively. Consequently, use of the C/A code and the P code yield position data only at a relatively coarse level of resolution.

The second type of signal utilized for position determination is the carrier signal. The term "carrier", as used herein, refers to the dominant spectral component which remains in the radio signal after the spectral content caused by the modulated pseudorandom digital codes (C/A and P) is removed. The L1 and L2 carrier signals have wavelengths of about 19 and 24 centimeters, respectively. The GPS receiver is able to "track" these carrier signals, and in doing so, make measurements of the carrier phase to a small fraction of a complete wavelength, permitting range measurement to an accuracy of less than a centimeter.

In stand-alone GPS systems that determine a receiver's position coordinates without reference to a nearby reference receiver, the process of position determination is subject to errors from a number of sources. These include errors in the satellite's clock reference, the location of the orbiting satellite, ionospheric refraction errors (which delay GPS code signals but advance GPS carrier signals), and tropospheric induced delay errors. Prior to May 2, 2002, a large portion of the satellite's clock error, referred to as Selective Availability (SA) was purposefully induced by the U.S. Department of Defense to limit GPS accuracy to non-authorized users. SA would often cause positioning errors exceeding 40 meters, but even today, with SA off, errors caused by the ionosphere can be tens of meters. The above mentioned error sources (satellite clock and satellite position errors, ionosphere refraction, tropospheric delay and SA) are common-mode errors for two receivers that are nearby. That is, the errors caused by these sources are nearly the same for each receiver Another error source, which is present in the carrier phase measurements, is the clock difference between the two receivers. This clock difference applies to all satellite measurements equally, and as such, can be eliminated by what is known as double differencing. This is where one of the satellites is used as a reference and the other satellite measurements are compared to it. This reduces the number of usable satellite measurements by one. As will be explained later, the more measurements available the better the final solution.

To overcome the common-mode errors of the stand-alone GPS system, many kinematic positioning applications make use of multiple GPS receivers. A reference receiver located at a reference site having known coordinates receives the satellite signals simultaneously with the receipt of signals by a remote receiver. Depending on the separation distance, the common-mode errors mentioned above will affect the satellite signals equally for the two receivers. By taking the difference between signals received both at the reference site and at the remote location, common-mode errors are effectively eliminated. This facilitates an accurate determination of the remote receiver's coordinates relative to the reference receiver's coordinates.

The technique of differencing signals is known in the art as differential GPS (DGPS) or differential GNSS (DGNSS). The combination of DGPS with precise measurements of carrier phase leads to position accuracies of less than one centimeter root-mean-squared (centimeter-level positioning). When DGPS/DGNSS positioning utilizing carrier phase is done in real-time while the remote receiver is potentially in motion, it is often referred to as Real-Time Kinematic (RTK) positioning.

One of the difficulties in performing RTK positioning using carrier signals is the existence of an inherent ambiguity that arises because each cycle of the carrier signal looks exactly alike. Therefore, the range measurement based upon carrier phase has an ambiguity equivalent to an integral number of carrier signal wavelengths. Various techniques are used to resolve the ambiguity, which usually involves some form of double-differencing of the carrier measurements. Once ambiguities are solved, however, the receiver continues to apply a constant ambiguity correction to a carrier measurement until loss of lock on that carrier signal or partial loss of lock that results in a carrier cycle slip.

Regardless of the technique deployed, the problem of solving integer ambiguities, in real-time, is always faster and more robust if there are more measurements upon which to discriminate the true integer ambiguities. Robust means that there is less chance of choosing an incorrect set of ambiguities. The degree to which the carrier measurements collectively agree to a common location of the GPS receiver is used as a discriminator in choosing the correct set of ambiguities. The more carrier phase measurements that are available, the more likely it is that the best measure of agreement will correspond to the true (relative to the reference GPS) position of the remote GPS receiver. One method, which effectively gives more measurements, is to use carrier phase measurements on both L1 and L2. The problem though is that it is relatively difficult to track L2 because it is modulated only by P code and the United States Department of Defense has limited access to P code modulation by encrypting the P code prior to transmission. Some receivers are capable of applying various cross-correlation techniques to track the P code on L2, but these are usually more expensive receivers than L1 only capable receivers.

Other approaches have been employed to gain additional measurements on GPS receivers utilizing additional satellites and other types of satellite systems such as the GLONASS system, pseudolites, or Low Earth Orbit (LEO) satellite signals in an attempt to enhance RTK. Nevertheless, it is often desired to perform RTK on low-cost L1 only receivers that do not have access to the GLONASS system, pseudolites, or LEO satellite signals.

GNSS Tracking Background

GNSS has been used in many tracking applications, including the tracking of moving objects. A typical example is GNSS tracking of vehicles, such as automobiles. Exemplary applications of GNSS vehicle tracking include vehicle guidance and control. Different tracking purposes require different GNSS sensitivity levels. For instance, a fast moving car does not have to have a highly-accurate tracking sensor as the car will move several feet in a second. Other GNSS tracking uses require centimeter-level tracking sensitivity, such as tracking slow moving or fixed objects to ensure that these objects do not move. When tracking slower moving objects, it is typically unnecessary to receive a GNSS position reading several times a second. One or two readings per day may be sufficient in some instances.

A particularly useful example of GNSS tracking is in the monitoring of structures for safety considerations. If a structure that is not supposed to move is equipped with a sensitive GNSS tracking system, the system can be used to determine whether the structure is moving and at what rate. Such information can help prevent the structure from collapsing, or at least provide an advance warning to evacuate. Instances where this level of detail would be suitable include drainage pond barriers, earthen dams, river levees, and other civil engineering structures which, if failed, would cause catastrophic results.

An exemplary application of centimeter-level tracking of relatively fixed structures are the settling ponds used for the extraction of oil from oil and tar sands. These ponds can contain hazardous and environmentally unsafe material. To extract crude oil from oil sands, clay and sand mixed with bitumen are placed in hot-water filled ponds to separate the mixture, causing the oil to settle on the top of the mixture where it can be extracted. Were the pond barriers to fail, the oil and other minerals stored in the ponds could flood nearby areas and cause extensive environmental harm. By tracking the pond wall movement, even at miniscule levels, such catastrophic barrier failure can be predicted and prevented.

Heretofore there has not been a system or method of GNSS tracking with the advantages and features of the present invention.

SUMMARY OF THE INVENTION

Disclosed herein in an exemplary embodiment is a method for measuring relative position of fixed or slow-moving points in close proximity comprising: receiving a set of satellite signals with a first receiver corresponding to a first position; receiving a related set of satellite signals with a second receiver corresponding to a second position; and computing a position of the second position based on at least one of code phase and carrier phase differencing techniques. At least one of: a clock used in the first receiver and a clock used in the second receiver are synchronized to eliminate substantial clock variation between the first receiver and the second receiver; and the first receiver and the second receiver share a common clock.

Also disclosed herein in another exemplary embodiment is a system for measuring relative position of fixed or slow-moving points in close proximity comprising: a first receiver in operable communication with a first antenna configured to receive a first plurality of satellite signals at a first position; and a second receiver in operable communication with a second antenna configured to receive a second plurality of satellite signals at a second position; and at least one of the first receiver and the second receiver computing a position corresponding to a position of the second antenna based on at least one of code phase and carrier phase differencing techniques. At least one of: a clock used in the first receiver and a clock used in the second receiver are synchronized to eliminate clock variation between the first receiver and the second receiver, and the first receiver and the second receiver share a common clock.

Further, disclosed herein in yet another exemplary embodiment is a system for measuring relative position of fixed or slow-moving points in close proximity comprising: a means for receiving a set of satellite signals with a first receiver corresponding to a first position; a means for receiving a related set of satellite signals with a second receiver corresponding to a second position; and a means for computing a position of the second position based on at least one of code phase and carrier phase differencing techniques. At least one of: a clock used in the first receiver and a clock used in the second receiver are synchronized to eliminate clock variation between the first receiver and the second receiver, and the first receiver and the second receiver share a common clock.

Also disclosed herein in yet another exemplary embodiment is a storage medium encoded with a machine-readable computer program code, the code including instructions for causing a computer to implement the abovementioned method for measuring relative position of fixed or slow-moving points in close proximity.

Further disclosed herein in yet another exemplary embodiment is a computer data signal, the computer data signal comprising code configured to cause a processor to implement the abovementioned method for measuring relative position of fixed or slow-moving points in close proximity, such as dams, bridges and other structures. Still further, applications are disclosed for the system and method using L1 receivers and RTK. Additional applications include marine vessels, terrestrial vehicles and aircraft with partially blocked GNSS antennas. Multipath effects are mitigated by averaging the GNSS signals received by multiple antennas or by an antenna(s) and multiple locations.

BRIEF DESCRIPTION OF THE DRAWINGS

Referring now to the drawings wherein like elements are numbered alike in the several figures:

FIGS. 5A-C show constrained, multiple-antenna GNSS positioning systems with satellite-blocking objects.

DETAILED DESCRIPTION OF PREFERRED ASPECTS OF THE INVENTION

I. Introduction and Environment

Figure 1:
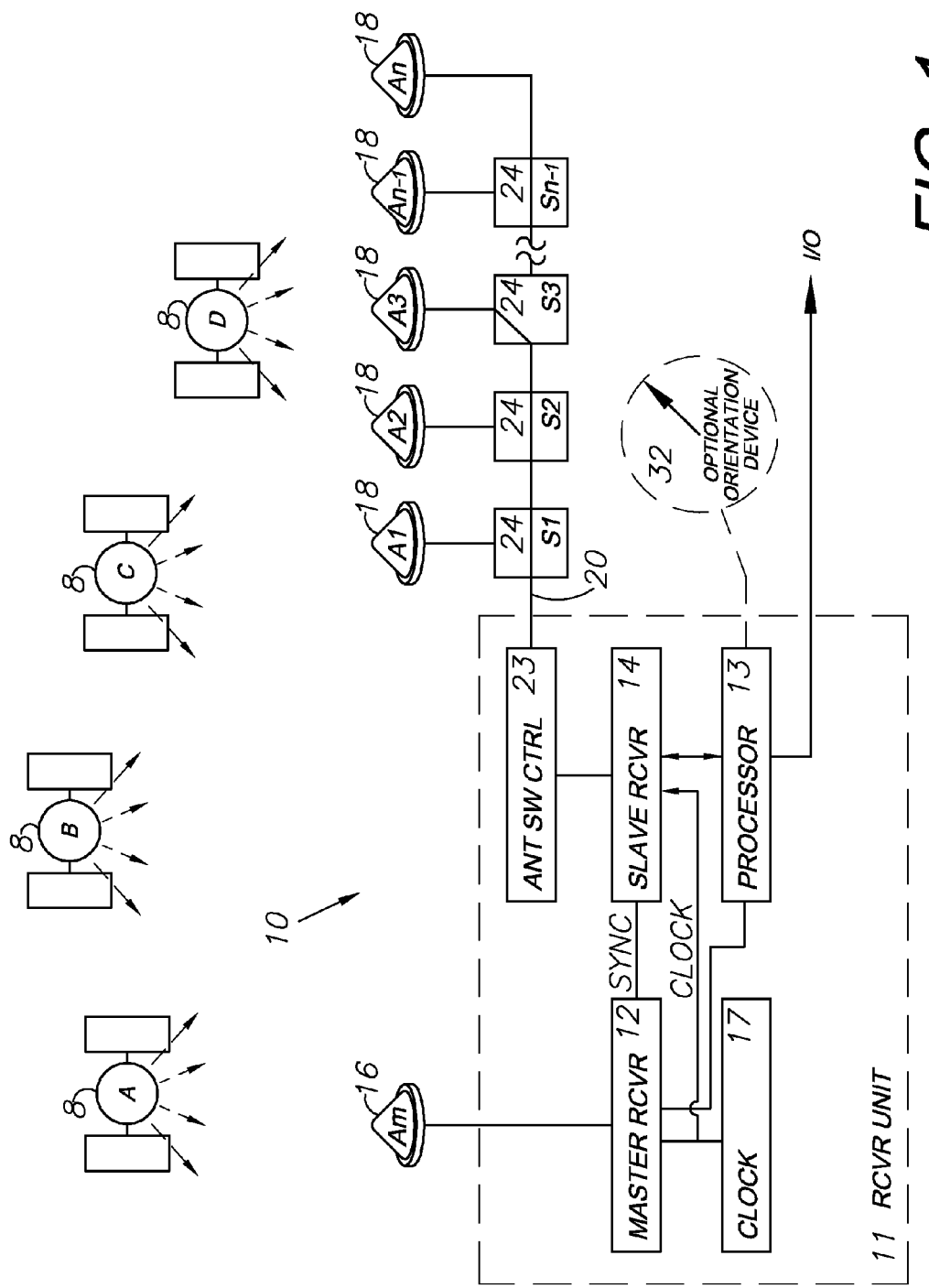
FIG. 1 is a diagram of a system embodying an aspect of the invention and including combined master and slave receivers.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Global navigation satellite systems (GNSS) are broadly defined to include the global positioning system (GPS, U.S.), Galileo (proposed), GLONASS (Russia), Beidou (China), Compass (proposed), the Indian Regional Navigational Satellite System (IRNSS), QZSS (Japan, proposed) and other current and future positioning technology using signals from satellites, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, Y and X axes respectively. Said terminology will include the words specifically mentioned, derivatives thereof and words of similar meaning.

The present aspect of this invention is suited for tracking the position, heading, and orientation of slow-moving or fixed bodies in two or three dimensions. This aspect of the invention discloses the use of two receivers, which either share the same clock, or have a clock synchronization technique to eliminate the receiver clock errors. The reference receiver (herein called the master) is connected to a single antenna whereas the slave receiver, which is clock synchronized with the master, has a multitude of antennas connected to it, which are switched in and out to take a measurement at each antenna location. Multi-antenna GNSS systems and methods are disclosed in U.S. Pat. Nos. 7,292,185 and 7,400,956, which are assigned to a common assignee herewith, and U.S. Patent Publication No. 2009/0201203 A1, all of which are incorporated herein by reference.

The GPS slave (e.g., rover) receiver computes the location vector from a double or single difference of the GPS rover and reference carrier phases for a plurality of GNSS satellites. As the receivers are either co-located or have a link, the raw measurements from the slave antennas are sent to the master for computation (of course any receiver or even a separate computer could perform this computation). This eliminates the need for a radio link between the master and slave receivers as is required in prior art RTK.

According to a more specific aspect of the present invention, in order to solve the integer ambiguity problem, the master selects the slave antenna to be measured based on the GPS satellite almanac to provide the best geometry (or one of the best) and based on its time slot. The master also has the slave antenna's position stored to provide an immediate calculation of the carrier cycle ambiguity to each satellite. Position calculation then follows conventional RTK GPS practice of using single or double difference equations involving the total phase distance to each satellite to solve the relative location of the slave antenna with respect to the master antenna. As previously described, there is no clock difference between the two receivers (or the clock difference is known and nearly constant) so double differencing may not be required. There may however be a significant delay through the coaxial cable to each slave antenna. This also can be stored and the delay removed to the measurements. A temperature drift may be noticed which will gradually change the delay, but this too can be eliminated by the addition of a thermocouple to determine the ambient temperature around the cable and antennas. By doing this, all satellite measurements may be used in the solution.

Another advantage of eliminating double differencing is that ambiguity search routines will not have to form linear combinations to decorrelate the measurement data. When it is possible to use single differences, they are generally preferred over double difference equations. The double difference cross-correlations are more difficult to deal with mathematically, say in a measurement covariance matrix of a Kalman filter. Single difference equations result in a measurement covariance matrix having zero cross correlation. However, accuracy can be achieved with both approaches.

II. Position Tracking System and Method

Figure 1A:
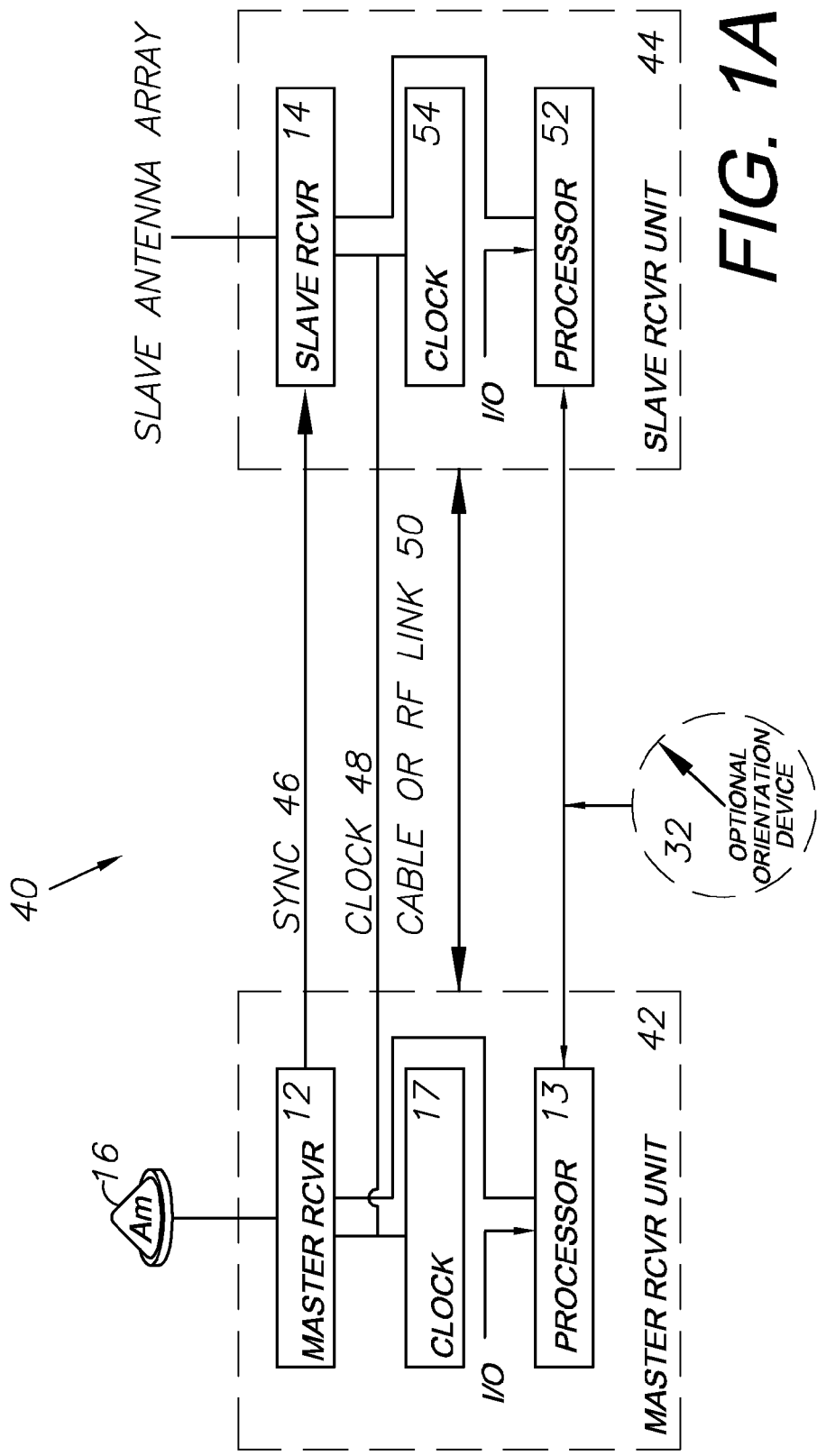
FIG. 1A is a diagram of a system embodying an alternative aspect of the invention and including separate master and slave receivers.

Referring now to FIGS. 1 and 1A, two distinct, simplified block diagrams of a GNSS positioning system 10 embodying aspects of the present invention are depicted. In an exemplary embodiment, a receiver unit 11 is attached to a rigid body, employing a method and system comprising two receivers, which either share the same clock 17, or include a clock synchronization technique to eliminate the receiver clock errors, a processor (CPU) 13, and an orientation device 32. Further, the reference receiver (hereinafter also called the master or base receiver) 12 is connected to a master antenna 16 (Am), whereas the rover or slave receiver 14, which is clock synchronized with the master receiver 12, has a multitude of antennas 18 (A1-An) connected to it, which are switched in and out to take a measurement at each antenna location. As shown in FIG. 1, the master receiver 12 and the slave receiver 14 are combined in a single receiver unit 11 on a common printed circuit board (PCB), which also includes a central processing unit (CPU) 13, a temperature sensor 15, a clock 17 and an antenna switch control 23. In addition, the master receiver 12 and slave receiver 14 may include direct connection for wireless communication to facilitate communication between them. The slave receiver 14 is then electrically connected to a processor 13, which may be any suitable processing unit commonly employed by GNSS guidance systems. It will be appreciated that while an exemplary embodiment is described and illustrated with respect to measuring movement of a dam, dike or beam, the disclosed invention is readily applicable to other applications where fixed or slow moving phenomena are tracked. Such applications may include roadways, bridges, building motion, glacier and iceberg travels and the like. It is also applicable to conventional RTK applications that require relatively short distances between master and slave receivers and where it is desirable to take advantage of a common clock for added robustness and the elimination of a radio for cost and robustness. For example, one application is local surveying or measuring distance at a construction site, or leveling (such as required for foundation placement) at that site.

In an exemplary embodiment a master receiver 12 also referred to as a reference receiver, and a slave receiver 14, also referred to as a rover or remote receiver are substantially co-located. The master and slave receivers 12, 14 are configured to either share the same clock 17, or include a clock synchronization system (SYNC connection). This technique facilitates elimination of the receiver clock errors. The CPU 13 computes a location vector based on a double or single difference of the GNSS code and/or carrier phases for the master receiver 12, the slave receiver 14 and a plurality of GNSS satellites 8. As the master and slave receivers 12 and 14 are either co-located or have a link, the raw measurements from the slave antennas are sent to the CPU 13 for computation (of course any receiver or even a separate computer could perform this computation). This eliminates the need for a radio link between the master and slave receivers 12, 14 as is required in existing RTK applications. Moreover, in another exemplary embodiment, satellite signals from multiple antennas with a known dimensional separation may be combined to achieve receiving an optimal set of satellite 8 signals for a given location. Such an approach will be beneficial for instances when insufficient data is available from a single antenna or a less desirable set of satellite 8 signals is all that is available. In this way, a location may still be computed despite poor satellite 8 geometry, obstructions, and the like.

Advantageously, in an exemplary embodiment, rather than increasing the number of measurements, a reduction in the number of unknowns is achieved by eliminating the clock errors between the reference receiver 12 and the rover 14 (or master and slave). This approach yields an even greater advantage than adding measurements, unless a substantial number of measurements could readily be added. In addition, an exemplary embodiment as disclosed herein significantly improves the ability to calculate the integer ambiguities to each satellite 8. It will be appreciated that because the slave antennas 18 are presumed to move far less than a fraction of a carrier cycle (e.g., 19 cm) between measurements, the positions of each slave antenna 18 location may be stored and then later retrieved as needed to facilitate the immediate calculation of the integer ambiguities. The typical base carrier wavelength ($\lambda_{ca}$) is approximately 19 cm. Because $\lambda_{ca}$ is so short, integer ambiguity issues appear when using base carrier waves for tracking fast moving objects, hence the need for code phase wave and RTK measurement. For the present embodiment, however, a $\lambda_{ca}$ is ideal. 19 cm would be a significant amount of movement for a levee, dam, or other typically fixed structure. Movement recorded by the preferred embodiment of the present invention will likely be under 19 cm and thus perfectly suited to being tracked using base carrier waves.

In order to solve the integer ambiguity problem with current RTK applications, the master receiver 12 selects a particular slave antenna 18 to be measured based on the GPS satellite almanac to provide the best geometry (or one of the best) and based on its time slot. The master receiver 12 also has the slave antenna's position stored (as stated above) to provide an immediate calculation of the carrier cycle ambiguity to each satellite 8. Position calculation then follows RTK GNSS practice of using single or double difference equations involving the total phase distance to each satellite 8 to solve the relative location of slave antenna 18 with respect to the master antenna 16. One such methodology for GNSS positioning employing RTK is taught by Whitehead, U.S. Pat. No. 6,469,663 the contents of which are incorporated by reference herein in their entirety. As previously described, there is no clock difference between the two receivers 12 and 14 (or the clock difference is known and nearly constant) so double differencing may not be required. It will however, be readily appreciated that there may be a significant delay through a coaxial cable 20 to each slave antenna 18. This delay is dependent upon the selected position for each antenna relative to the master (e.g., the length of cable 20 to reach each antenna 18). Advantageously, the delay may readily be measured and stored and the delay mathematically removed to correct the measurements. Moreover, selected antennas 18 may exhibit a temperature drift that may result in a gradual change of the expected delay. However, advantageously, this too may be readily eliminated by the addition of a temperature sensor 15 connected to a thermocouple 22 to determine the ambient temperature around the cable 20 and the antennas 16 and 18. Advantageously, by employing the abovementioned correction and compensation schemes, all satellite 8 measurements may be used to formulate the solution.

Another advantage of eliminating double differencing is that ambiguity search routines will not have to form linear combinations to decorrelate the measurement data. When it is possible to use single differences, they are generally preferred over double difference equations. The double difference cross-correlations are more difficult to deal with mathematically, say in a measurement covariance matrix of a Kalman filter. Single difference equations result in a measurement covariance matrix with zero cross-correlation, which facilitates computation of the ambiguities. The accuracy of both approaches should be substantially similar. However, single differencing is an easier process.

In yet another exemplary embodiment as an enhancement to the abovementioned embodiments uses the capability to take advantage of the slow dynamics of antenna motion by averaging over periods of time, thereby reducing multipath contributions (which are time-varying) and poor satellite 8 geometries. In fact, it will be appreciated that the master receiver 12 is constantly tracking the satellites 8 and may further be employed to select the best time(s) of day, e.g., the best constellation (the GNSS satellites 8 orbit in approximately a 12 hour cycle), to perform the measurements based on its knowledge of the slave antennas' 18 positions and the satellites currently visible. Additionally the master receiver 12 may select one or two separate times of day to provide two independent satellite position constellations for performing the measurements. This would reduce the amount of averaging time required, yet still provide the multipath and poor satellite geometry reduction benefits. Overall, such an approach may be employed to reduce power consumption requirements as the receiver 12 would not have to be averaging continuously for a twelve hour period. Power consumption reduction can be beneficial, especially at remote sites.

Because GNSS satellites return to their original position approximately once every 24 hours, the system 10 can solve for multipath issues by taking into account this repeating signal. Minute-to-minute position tracking is generally not necessary in stationary or slow moving rigid bodies, so one position tracking measurement in a 24-hour period is enough. The same multipath is received every 24-hour period, and so the system 10 can account for incorrect multipath signals arriving in the same pattern repeatedly.

Referring once again to FIG. 1, the system 10 is shown configured with a plurality of slave antennas 18 (also denoted as A1, A2 ... An) connected to the slave receiver 14. Each slave antenna 18 is switched (except the last one which is selected when all switches are connected through to it) with a switch box 24 (also denoted as S1, S2 ... ). The switch(es) 24 are activated and the antennas 18 selected by an antenna switch controller 23, which can be incorporated on the receiver unit 11. The antenna switch controller 23 can send a tone or some other control signal 30 on the cable 20 to activate a particular desired switch 24 and thereby activate the slave antenna 18 connected thereto. It will be appreciated that in order to provide fault protection, the switch(es) 24 may be designed and configured so that in the event a switch 24 fails, the connection through to the next switch 24 is made. Advantageously, in this way, if one switch 24 should fail, it will still permit measurements on the remaining slave antennas 18. Smart reset circuitry can be employed to insure that the master receiver 12 and the slave receiver 14 will start up at the same instant and therefore the samples will be aligned as well. This approach substantially eliminates any receiver clock biases.

As mentioned previously, phase drift and delay can result from the coaxial cables 20, which may be removed and/or compensated by using a temperature sensor 15 connected to a thermocouple 22 to measure the temperature. A look-up table may be employed by the CPU 13 that has stored (alternatively a simple formula may be used to save memory) phase delay difference versus ambient temperature. An alternative embodiment could use equivalent coaxial cable 20 lengths to all antennas 16, 18 so that any temperature or other loss and drift effects would be matched and therefore cancelled in the single difference calculation.

Normally in order to solve for integer ambiguities from GNSS satellite 8 signals, double differencing is used to bring forth the integer nature of the ambiguities by removing other non-integer sources of error such as clock and atmospheric delays from the measurements. To illustrate, consider four equations describing pseudo-ranges resulting from measurements of carrier phase on receivers denoted m and n for the slave and master, respectively:

$$\phi_m^i = R_m^i + \tau s v^i + A^i + B_m + N_m^i$$

$$\phi_n^i = R_n^i + \tau s v^i + A^i + B_n + N_n^i$$

$$\phi_m^k = R_m^k + \tau s v^k + A^k + B_m + N_m^k$$

$$\phi_n^k = R_n^k + \tau s v^k + A^k + B_n + N_n^k \quad \text{i.}$$

Here $\phi_m^i$ is the measured pseudorange from rover receiver m to satellite i, $\phi_n^i$ is the measured pseudorange from reference receiver n to satellite i, $\phi_m^k$ is the measured pseudorange from rover receiver m to satellite k, and $\phi_n^k$ is the measured pseudorange from reference receiver n to satellite k. Each pseudorange is actually a measure of the summation a number of different physical quantities all of which shall be expressed in units of carrier cycles at L1 (roughly 19 cm).

Specifically, in the first of these equations, the term $R_m^i$ is the true geometric range from receiver m to satellite i, $\tau s v^i$ is the clock error of satellite i, $A^i$ is the atmospheric delays, which are associated with satellite i, $B_m$ is the clock error of receiver m, and $N_m^i$ is the integer ambiguity in the range measurement from receiver m to satellite i. Similar notation applies to the remaining three equations. For simplicity, these equations do not show noise effects such as errors caused by receiver thermal noise or multipath noise.

Consider first applying the single difference. If the first two equations are differenced:

$$\phi_m^i - \phi_n^i = R_m^i - R_n^i + B_m - B_n + N_m^i - N_n^i \quad \text{i.}$$

Similarly, differencing the second two equations yields: ii.

$$\phi_m^k - \phi_n^k = R_m^k - R_n^k + B_m - B_n + N_m^k - N_n^k \quad \text{iii.}$$

The satellite common errors, such as satellite clock, $\tau s v^i$ and atmosphere, $A^i$ (atmosphere is common if we assume relative close proximity of receivers m and n) are removed in the single difference. As the clock errors $B_m$ are common these term will also cancel out, leaving:

$$\phi_m^i - \phi_n^i = R_m^i - R_n^i + N_m^i$$

Since the ambiguities are all integers that can be lumped together into a single term, it may be written:

$$\phi_m^i - \phi_n^i = R_m^i - R_n^i + N_{mn}$$

where $$N_{mn} = N_m^i N_n^i$$

This shows that single differencing the pseudo range measurements removes common atmospheric errors from the equations while leaving simple combinations of the geometric ranges and integer ambiguities, and clock errors drop out due to the synchronization of the two receivers. For N satellites in common view of the master (reference) and slave (remote) receivers 12 and 14 respectively, there are N such single-difference equations that can be formed without causing mathematical redundancy. Whereas double differencing, to eliminate clock biases in receivers, which are not clock synchronous, results in only N−1 equations. This gives rise to N unknown integer ambiguities that must be solved in addition to the 3 unknown coordinates (X,Y,Z) of the GPS receiver. Note that each geometric range term, for example $R_m^i$ is a function only of the receiver's position and the transmitting satellite's position. Specifically:

$$R_m^{i=} = \sqrt{(Xrecv_m - Xsat^i)^2 + (Yrecv_m - Ysat^i)^2 + (Zrecv_m - Zsat^i)^2}$$

where $Xrecv_m$, $Yrecv_m$, $Zrecv_m$ are the Cartesian coordinates of the receiver m at the time reception of the signal from satellite i, whose coordinates are $Xsat^i$, $Ysat^i$, $Zsat^i$ at the time of signal transmission. In the problem at hand, only the selected slave's antenna's 18 position is unknown. Once the ambiguities are determined, only the selected antenna's 3-coordinates of position are unknown and these are easily solved using a mathematical approach such as Least Squares.

Every time a new slave antenna 18 is selected, the integer ambiguities must be solved. This is a complex process and can be very time consuming if the position is unknown. However, in this instance, it will be appreciated that the movements to be measured are on the order of less than a quarter of a wavelength (5 cm) between measurements. This limitation permits a rapid calculation of the integer ambiguities since the master receiver 12 or the CPU 13 "knows" the satellite's position and the selected antenna's position well enough to directly calculate ambiguities. Such an approach will greatly reduce the time utilized to solve for the integer from up to 10 minutes to a second or less. Cycle slips, which result usually from motion which the receiver failed to track properly and therefore slipped from one ambiguity to another is also greatly reduced due to the very low dynamics of the selected antenna location. An added benefit of the low dynamics is the receiver can integrate the measurements over a long period of time and narrow the carrier tracking loop bandwidth to reduce noise.

As mentioned previously, it should be appreciated that another source of error in applying RTK positioning, especially when solving for integer ambiguities over long baselines, is non-common atmospheric propagation delays on the signals received by the slave (rover) 14 and master (reference) receivers 12. Since differencing cannot eliminate these non-common delays, the next best alternative is to estimate or model their effects. However, in an exemplary RTK embodiment, the slave antennas 18 and the master antenna 16 will most likely be within 5 kilometers of each other and at this distance the atmospheric effects are minimal and may readily be ignored. An optional orientation device 32, such as a compass or some other non-GNSS orientation device, can be affixed to a structure of interest to determine its attitude or orientation and to provide a corresponding signal to the CPU 13 for processing in connection with GNSS ranging data received via the receivers 12, 14. Alternatively, the orientation device 32 can comprise two or more antennas 16, 18 providing input to the master and slave receivers 12, 14 whereby attitude or orientation information can be derived by the processor 13.

A further advantage of this technique is that it permits a carrier phase based solution even when a large portion of the sky, and therefore the visible satellites, are obscured by a wall, dam (FIG. 2) or other structure. This is because, as described above, the receivers 12, 14 will still have one more measurement than previously due to the utilization of single differencing rather than double differencing techniques. In addition, the fixed or very slow moving nature of the problem permits long-term measurements.

FIG. 1A shows a GNSS positioning system 40 comprising an alternative aspect of the present invention with a master receiver unit 42 and a separate slave receiver unit 44, which can be connected by a clock-synchronizing connection (SYNC) 46 of the receivers 12, 14, a clock-sharing connection 48 and a link 50, which can comprise a cable or an RF connection between suitable transmitters and receivers. An optional orientation device 32 can be connected to either or both of the receiver units 42, 44, e.g., to the CPU 13 and/or an optional CPU 52 of the slave unit 42. Optionally, the slave unit 44 can include a clock 54, which can be synchronized with the master receiver unit clock 17. The slave receiver 14 is connected to a slave antenna array, which can comprise a single antenna or a multiple-antenna array as shown in FIG. 1.

III. Application in a Dam 62 or Fixed Object

Figure 2:
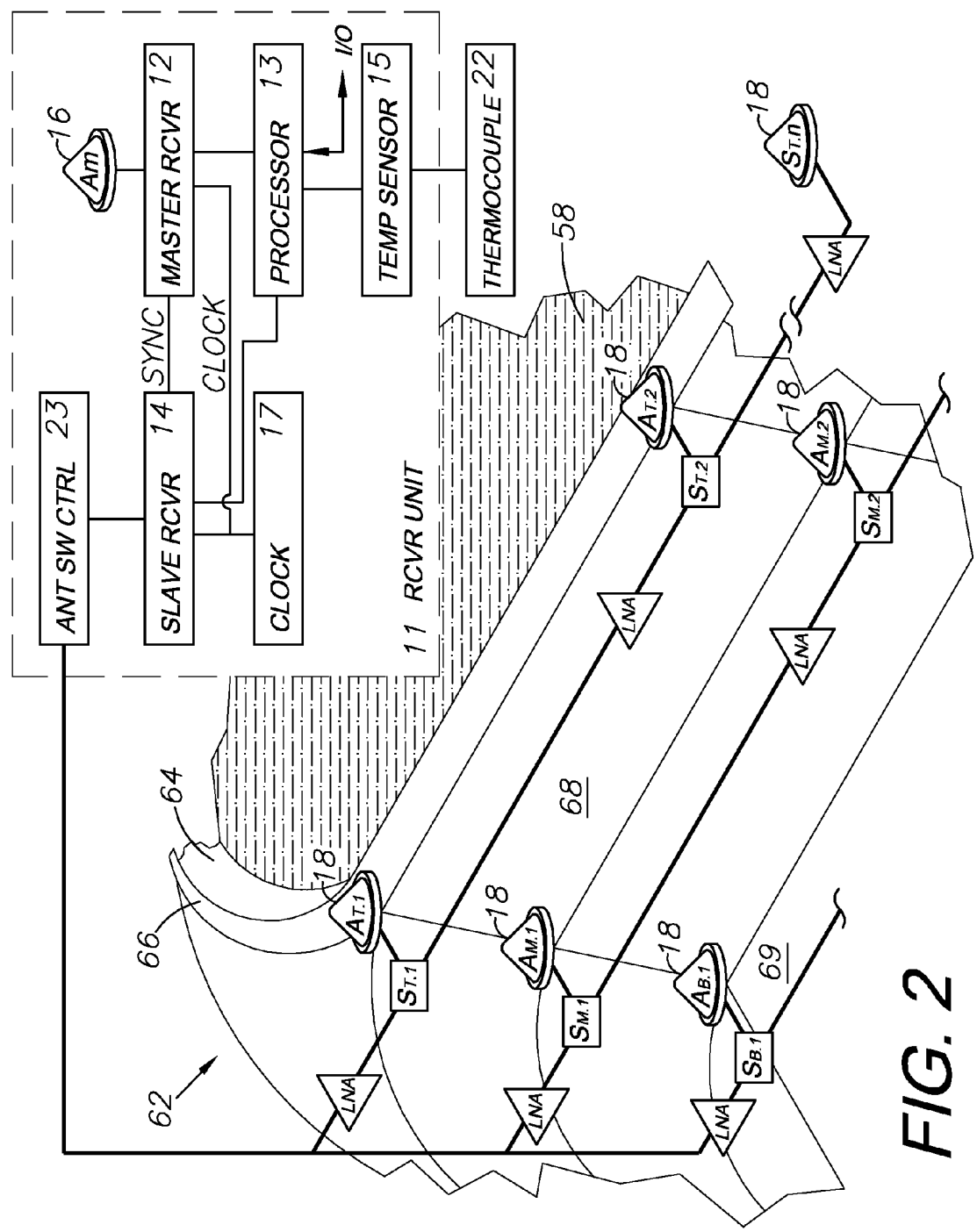
FIG. 2 is an upper, perspective view of a dam equipped with the position tracking system of the present invention, which system is shown in a block diagram.
Figure 2A:
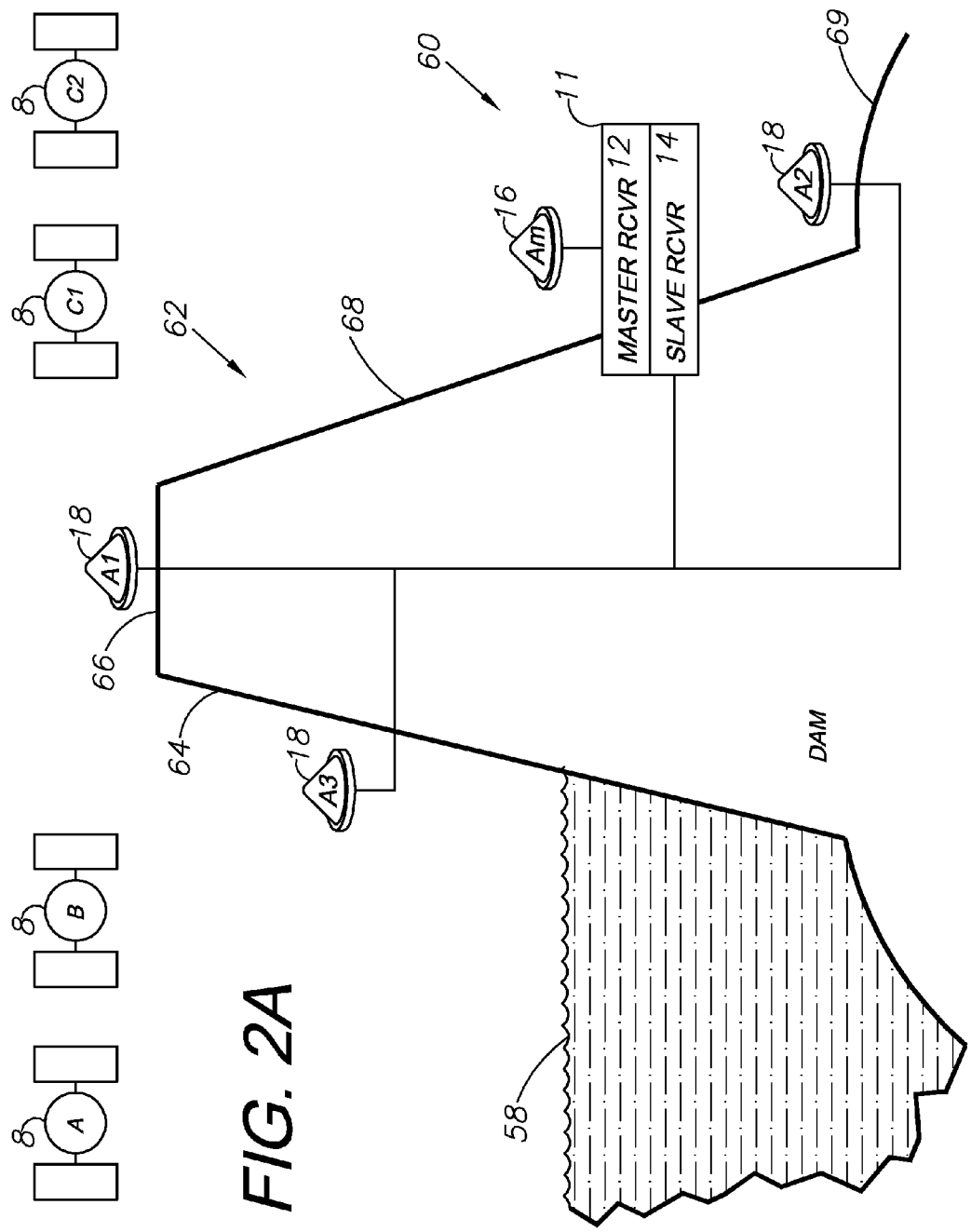
FIG. 2A is a vertical, cross-sectional view of an application of the invention, shown in connection with a dam for monitoring the locations of various points thereon.

Referring now to FIGS. 2 and 2A, in a GNSS dam-monitoring positioning system 60 comprising yet another exemplary embodiment, a technique is employed to utilize and take advantage of the master receiver's 12 knowledge of the satellites' locations in the sky, and a preprogrammed knowledge of the visibility of the sky for selected slave antennas 18. For example, FIG. 2A shows a configuration of satellites 8 and slave antennas 18 whereby the slave antenna A1 receives ranging data transmissions from all four satellites (A, B, C1, C2), but slave antenna A2 only receives transmissions from satellites C1, C2 and slave antenna A3 only receives transmissions from satellites A, B. The master receiver 12 and/or the CPU 13 may then choose the best time, that is, the time with the most satellites visible to the selected slave antenna 18, to perform the measurement at that location. The receiver(s) can then dwell for some time (e.g., one-half hour) to integrate and reduce noise, then move on to another slave antenna 18. Moreover, it will be appreciated that the master receiver 12 and/or the CPU 13 may direct that the slave receiver 14 return to the same location after some duration, e.g. a few hours, when another optimal/desirable geometry is available, which is uncorrelated to the first. By taking measurements at two (or more) different times (and geometries), and averaging the two (or more) measurements, multipath and atmospheric induced errors, typically correlated over time, will be reduced. This method will allow monitoring of the face of a dam 62 or berm, or even a valley wall.

The satellites' geometry is repetitive, approximately daily with about a one minute procession. Thus, based on 12-hour orbits and the Earth's rotation, the geometries of the GNSS satellite constellations will predictably realign. For example, the GPS constellations will realign at intervals of approximately 24 hours and 1 minute. Such periodicity can be utilized by the system 60 for minimizing or eliminating multipath errors by programming the processor 13 to compute GNSS-based locations of the respective antennas 16, 18 utilizing the same satellite patterns at each antenna approximately daily.

Further assumptions may be made of the anticipated motion of the monitoring point at the selected slave antenna 18 to further reduce the number of measurements required. For example, the motion is of a dam is generally horizontally away from the pressure excerpted by the body of water behind it. By performing the calculation only in this direction, a single satellite may be enough to perform a measurement. This is obvious when looking at this equation:

$$R_m^{i=} = \sqrt{(Xrecv_m - Xsat^i)^2 + (Yrecv_m - Ysat^i)^2 + (Zrecv_m - Zsat^i)^2}$$

As explained previously the satellite position (Xsat, Ysat and Zsat) are known, and if the receiver assumes there is minimal motion in Y and Z, then there is only one unknown left. Of course, additional satellites are highly desired to reduce noise and errors and to help detect any false or erroneous readings from throwing the solution off.

Another area of concern for running a long length of coaxial cable 20 to the antennas 16, 18, other than phase delay, which was addressed earlier, is attenuation. In yet another exemplary embodiment, the slave antennas 18 may be configured as active antennas, e.g., antennas that include an internal Low Noise Amplifier (LNA). In a receiver design, the noise figure is often important, and comprises a combination of the noise temperature before the first LNA, the LNA noise figure and subsequent losses divided by the LNA gain. Subsequent amplifier gains will reduce following noise temperature (T) contributions by their gain as is shown in the equation below:

$$Tt = T(preLNA) + T(LNA) + T(lna2)/(CL \times Glna1) + T(lna3)/(CL \times Glna1 \times Glna2) + T(lna4)/(CL \times Glna1 \times Glna2 \times Glna3) \text{ etc.}$$

where: CL refers to cable losses in linear terms, that is −10 dB is 0.1,

Glnan refers to gain of LNAn in linear terms so a gain of 20 dB is 100,

T(LNAn) refers to the noise temperature in Kelvin of stage n.

Noise Figure (F) is related to noise temperature by:

$$F(dB) = 10 \times LOG((1+T)/Tamb)$$

Where Tamb refers to the reference temperature, typically 290 K (20 Celsius).

As an example, a typical low loss coaxial cable (RG6 type) has 20 dB (CL=0.01) of attenuation every 100 meters. The noise temperature of the antenna and LNA is 170 K (2 dB noise figure), the gain of the first LNA is 30 dB (or 1000). Subsequent LNA's have the same noise temperature and a gain of 12 dB (15.8). If each antenna is 50 meters apart the losses are −10 dB. After five stages the noise temperature of the system is:

$$T5 = T1 + T2/(CL1 \times G1) + T3/(CL1 \times C12 \times G1 \times G2) + T4/(CL1 \times C12 \times C13 \times G1 \times G2G3) + T5/(CL1 \times C12 \times C13 \times C14 \times G1 \times G2 \times G3 \times G4)$$

$$T5 = 190 + 190/100 + 190/158 + 190/250 + 190/395$$

$$T5 = 194 \text{ K}$$

$$F5 = 2.22 \text{ dB}$$

This is compared to the first stage, which would have a noise figure of 2 dB. A GPS receiver such as the master receiver 12, or slave receiver 14 can operate with a noise figure of up to 3.5 dB without suffering significant degradation. As can be seen, additional stages will have diminishing contributions. The total gain will be increasing by only 2 dB each step, so after 1 km, in this example, the maximum gain will be 68 dB, the gain of the first stage is 30 dB, the Automatic Gain Control of the receiver can remove this difference easily. Also after 20 stages (1 km) the total noise temperature in this example would be T(1 km)=194.7 K, an insignificant increase.

FIG. 2 demonstrates an additional view of an application of the present invention measuring the slow, creeping movement of a dam 62 holding back a body 58. Multiple antennas 18 are placed throughout the upstream 64, downstream 68, and top 66 faces of the dam 62, and at the base 69 of the dam, and are connected, as a system, to the receiver unit 11. Positional data received by the receiver 12 is compared to previous data in the processor 13. If movement is detected, the user is notified immediately.

The various positions along the faces 64, 66, 68 aid the system 60 in recognizing miniscule movements along the entirety of the dam 62. FIGS. 2 and 2A together demonstrate a network of antennas 16, 18 spaced in rows set at various height levels along both the upstream 64 and downstream 68 faces of the dam, including at the base 69 of the dam and the top 66 of the dam. This allows the system 60 to detect dam 62 movement even if that movement only displaces a portion of the dam. The greater number of antennas 16, 18 placed on the faces 64, 66, 68, the greater accuracy the system 60 has in detecting dam movement. For instance, if the body 58, here represented by water, were to push out against a weak spot in the dam 62 near the base 69, the antennas located along the top face 66 would not detect dam movement until catastrophic failure was eminent. Thus, additional antennas placed in a networked pattern across the various dam faces increases the accuracy and detection of movement.

IV. Application in a Barge or Large, Slow Moving Vessel

Figure 3:
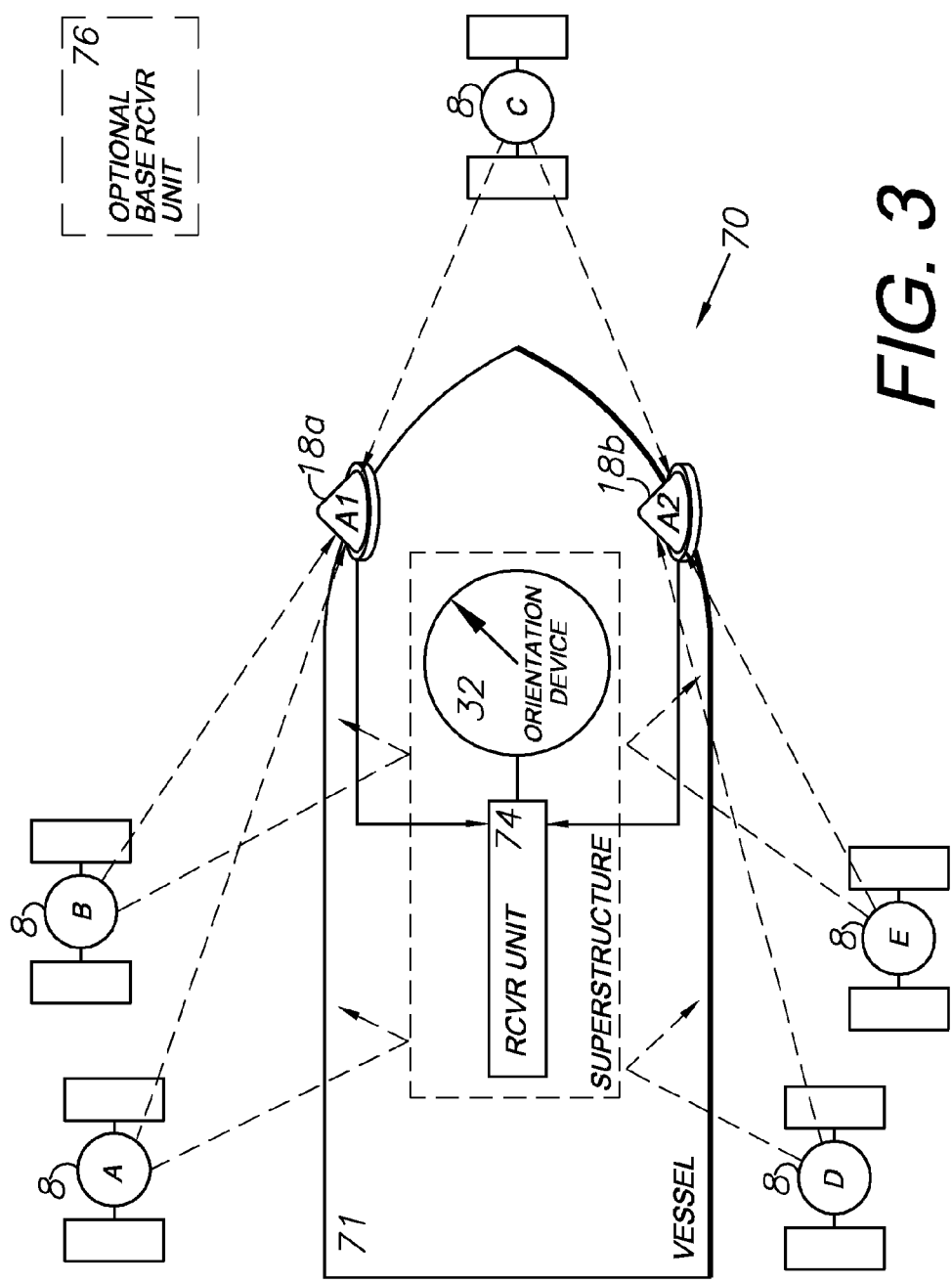
FIG. 3 is top plan view of another application of the invention including an orientation device, shown in connection with a marine vessel.
Figure 3A:
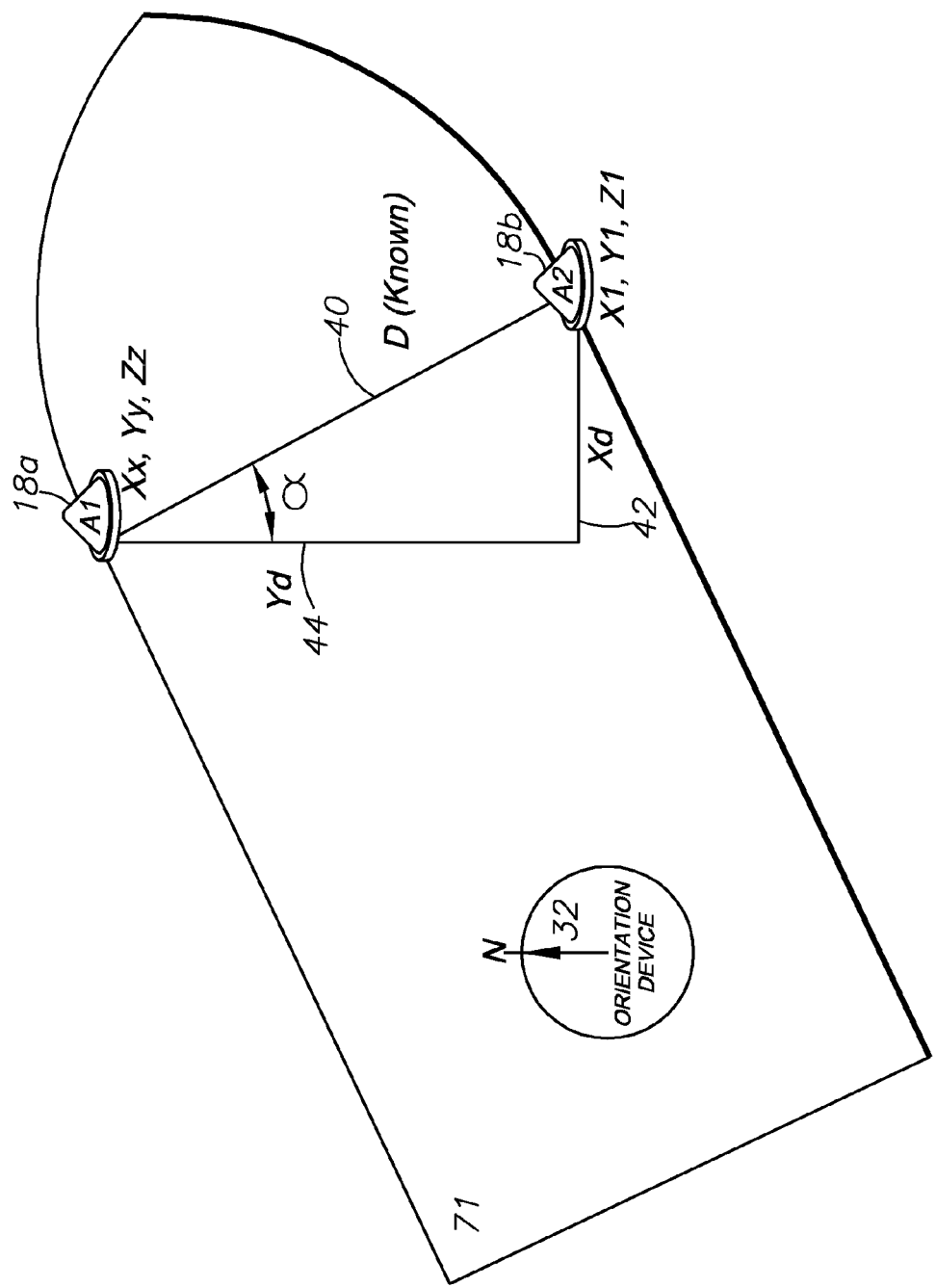
FIG. 3A is a top plan view thereof, showing trigonometric relationships associated with antennas mounted on the vessel.

FIGS. 3 and 3A demonstrate another exemplary embodiment, represented by a marine vessel (e.g., barge) 71 positioning system 70, wherein multiple antennas 18 (A1, A2) could be used to compute a solution of a single point on a rigid body to which they are attached using known geometry and distances as demonstrated by FIG. 3A. Such an approach may be employed, for example, when not any one antenna 18 provides enough useful information (satellites 8) to compute a location solution due to obstructions, e.g., a superstructure 72, but the constellation of satellites 8 could provide sufficient positioning data. In other words, the superstructure 72 partially blocks the antennas 16 (A1) and 18 (A2) from views of satellites 8 whereby each antenna 16, 18 receives GNSS positioning signals from some, but not all, of the satellite 8 constellation. It will be appreciated that the antennas 16, 18 are positioned in a predetermined, known relation (i.e. spacing and orientation) for determining attitude comprising yaw and roll, although the primary concern would be yaw because the antennas 16, 18 would normally remain at a relatively constant level in a marine application. The antennas 16, 18 are connected to a receiver unit 74, which can be similar to the receiver units described above.

Advantageously, a position solution employing this approach would not necessarily have to utilize carrier-phase based differencing (it could be code phase). An application might include positioning on a marine vessel 71, such as a barge as shown in FIG. 3, where the location of a reference point is needed, but there are cranes, towers and/or a superstructure 72 blocking the satellite view so that there is not one optimum GNSS location. However, by placing an antenna 18 on either side of the barge 71, enough satellites 8 could be tracked by the combined antenna 16, 18 arrangement that a solution of the location of some reference point on the barge 71 could still be obtained. Furthermore, on a barge 71, the orientation device 32, such as a compass, could also be used to give orientation, thus removing another unknown from the relative location of two receivers (e.g., 12, 14 in the receiver unit 74) rather than solving a relative location of one receiver with respect to the other by using the combined receivers 12, 14 to produce one non-relative location. The system shown in FIG. 3 can also include an optional base unit 76 for differential corrections, e.g., RTK applications. A position solution microprocessor (CPU) can be provided in the receiver unit 74 for calculating position solutions.

The common algorithms used to determine a point on a rigid body are demonstrated in FIG. 3A. The example shown demonstrates the orientation of a vessel in two-dimensions, but three-dimensional orientation is also possible using a third antenna. A first antenna 18a is located at a known location X1, Y1, Z1 and a second antenna 18b is located at a known distance D 40 away from the first antenna 18a and at unknown location Xx, Yy, Zz An orientation device 32 electrically connected into the processor of a guidance system can provide orientation data for the rigid body. This orientation information can be used to determine the angle α along which a vector drawn from the first antenna 18a towards the second antenna 18b is facing. Using this orientation data and the known distance 40 between the two antennas as the hypotenuse, simple trigonometry allows calculation of the position of the second antenna 18b. The formula is as follows:

Cos α=Yd/D

Sin α=Xd/D

X1−Xd=Xx

Y1−Yd=Yy

Xd 42 is the X-axis distance between the first antenna 18a and the second antenna, and Yd 44 is the Y-axis distance between the first antenna 18a and the second antenna 18b. In this equation, the Z-axis can be ignored as the rigid body in question only travels in the X-Y plane. However, Z-axis data can be calculated using similar well-known trigonometric algorithms. This calculation is similar to the method employed in U.S. Pat. No. 7,400,956, which is incorporated herein by reference. This method can also be employed to locate any point on the rigid body using the known position of two antennas as reference points.

The three-dimensional application is likely to be used more often in application of the present invention to a slowly shifting dam or barrier wall, whereas two-dimensional determinations apply to an application involving a slow moving vessel such as a barge.

As mentioned above, a proper computing means is necessary to retrieve all known data and calculate the resulting solution and locate a point. This computing means can be any typical central processing unit commonly employed by GNSS guidance systems, such as the processor 13 as shown by FIGS. 1 and 1A, and as disclosed in incorporated prior art U.S. Pat. Nos. 6,469,663 and 7,400,956.

Figure 4:
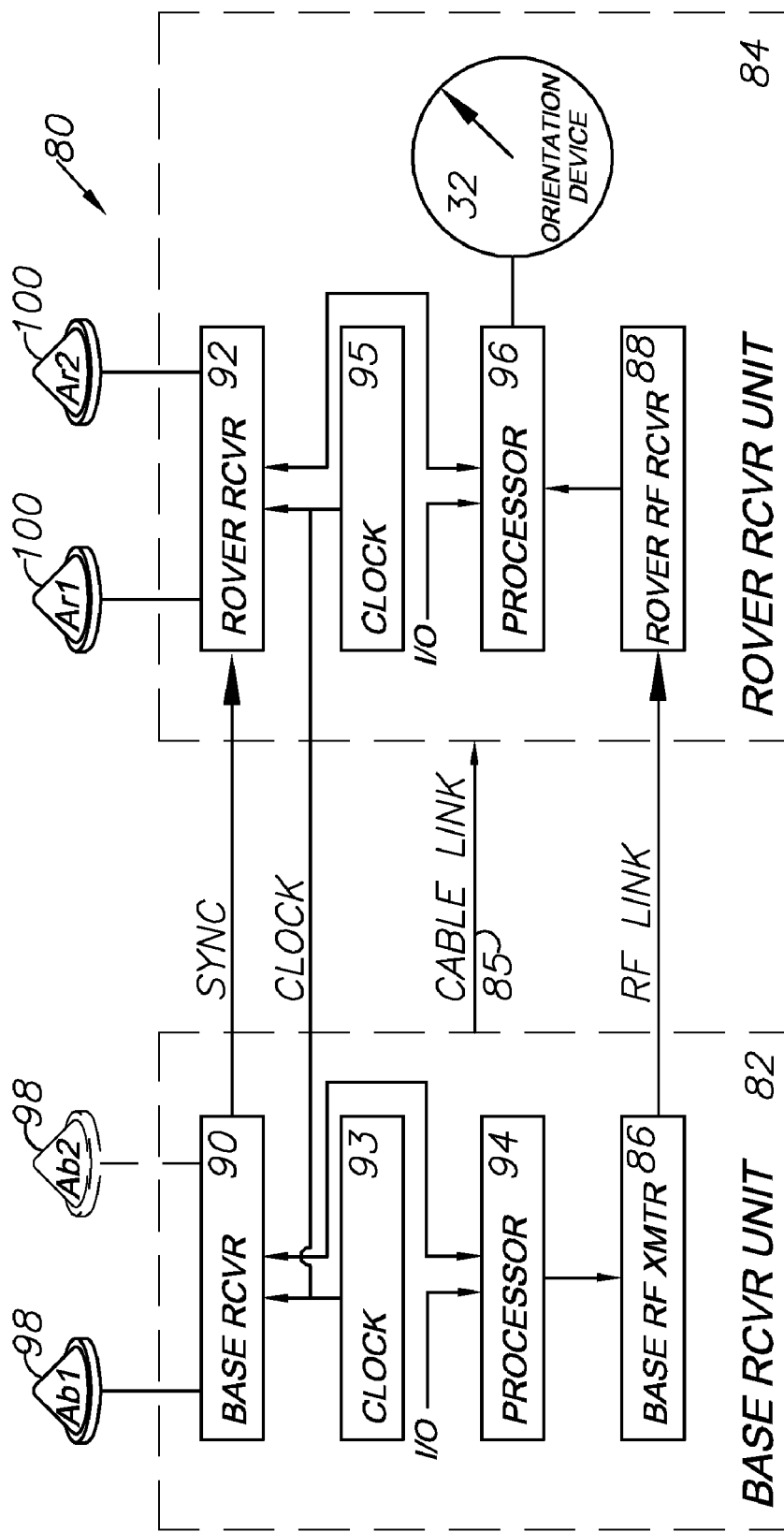
FIG. 4 is a diagram of a real-time kinematic (RTK) system embodying another aspect of the present invention and using single frequency (L1) receivers.

FIG. 4 shows a GNSS positioning system 80 comprising another alternative aspect of the present invention, with a base receiver unit 82 and a rover receiver unit 84, which can be configured similarly to the master and slave receiver units 42, 44 described above. The base and rover receiver units 82, 84 include base and rover GNSS receivers 90, 92, clocks 93, 95 and CPUs 94, 96 respectively. The base and rover receiver units 82, 84 can be connected by a cable link 85 for relatively close operation, such as surveying. Alternatively, the base and rover receiver units 82, 84 can be wirelessly connected via a base RF transmitter 86 and a rover RF receiver 88. An optional orientation device 32 can be connected to the rover CPU 92 for providing orientation and attitude information with respect to a rover vehicle or piece of equipment.

The receivers 90, 92 can comprise L1-only receivers, which tend to be less expensive than the more sophisticated dual frequency (L1/L2) receivers, which are commonly used for RTK fine positioning. The base receiver unit 82 is preferably equipped with a single base antenna 98 and the rover receiver unit 84 is preferably equipped with at least two rover antennas 100. Although the base receiver unit 82 could be equipped with multiple antennas (e.g., for reducing multipath errors) and the rover receiver unit 84 could be equipped with a single antenna, the normal preferred configuration includes multiple rover antennas 100 whereby the attitude (orientation) of the rover can be determined using GNSS ranging techniques. Attitude/orientation of the base is not generally needed for rover positioning.

The rover attitude information facilitates resolving integer ambiguities in GNSS positioning solutions by first solving for locations of the rover antennas 100 with respect to each other (an attitude solution). Next, using the known rover antenna relative locations, and nonrelative ambiguities, the system 80 solves for the global ambiguities using observations taken at each antenna 98, 100. The number of observations is thereby significantly increased over conventional RTK systems. The global ambiguities are the ambiguities of one rover antenna 100 that allow it be located in a global sense, i.e. relative to the base receiver unit 82.

The steps of the GNSS positioning method using the system 80 comprise:
1. Transmit code and carrier phase data from a base station to a multiple antenna rover system as would be done in a conventional RTK system that uses only one rover antenna.
2. At the rover side, determine the relative locations and relative ambiguities of the multiple antennas using an attitude solution that takes advantage of known constraints in geometry or clock as described in U.S. Pat. No. 7,388,539. The attitude solution is usually done much quicker than conventional RTK ambiguity resolution due to the use of geometry constraints and/or a common clock.
3. Optionally store off the attitude solution (locations and ambiguities) in step 2 for later retrieval so that the data can be time-tag matched with the data from the base station. Also store off the current GPS observations (carrier phase) for the same purpose. This step is not necessary, but time tag matching of base and rover data improves results by avoiding extrapolation errors (not so critical with SA off, except for possibly on the WAAS satellites which have been observed to have high phase jitter).

Form single or double difference equations and solve for the global ambiguities using knowledge of relative antenna locations/clocks and relative ambiguities.

An example is provided below.

Example Using the Two Antenna Rover System 80

At antenna one (1) of the rover, we can write the equation:

R1=[A]x1−N1,

Where R1 is a carrier phase observation vector (single or double difference) at antenna (1), A is a design matrix, X1 is the location vector of antenna 1 (may include clock if single differencing is used), and N1 is an ambiguity vector for antenna (1).

Similarly, at antenna two (2) we can write:

R2=[A]x2−N2,

Where R2 is a carrier phase observation vector at antenna (1), A is a design matrix, X2 is the location vector of antenna 2, and N2 is an ambiguity vector for antenna (2).

Thus, combining the above equations, we have:

R1=[A]x1−N1

R2=[A](x1+V)−(N1+M)

Re-arranging gives:

$$R1 = [A]x1 - N1$$

$$R2 - [A]V + M = [A]x1 - N1$$

And, combining into a single vector equation gives:

$$R = [A]x1 - N$$

Where $$R = [R1, R2 - [A]V + M]^T \text{ and } N = [N1, N1]^T$$

Where 'T' denotes transpose
(end of example)

Compared to conventional RTK techniques, the method described above provides twice as many equations (for a rover with two antennas 100) for the same number of unknowns X1 and N1. N1 is referred to as the global ambiguity, which is easier to solve for with more equations. For example, see Whitehead U.S. Pat. No. 6,469,663 for Method and System for GPS and WAAS Carrier Phase Measurements for Relative Positioning, which is incorporated herein by reference.

VI. Constrained, Multi-Antenna Systems

FIGS. 5A, 5B and 5C show constrained, multiple-antenna systems 101, 102, 103 respectively illustrating operation with different combinations of visible satellites 8. System 101 shows master and slave antennas 16 (Am, As) on a constraining structure 104 (i.e., common rigid body such as a wall, a dam, a marine vessel, a terrestrial vehicle, an aircraft, etc.) whereon the antennas 16 are mounted in fixed relation constrained by distance, geometry and time (by providing a common clock or synchronized clocks). Knowing the orientation of the structure 103 (e.g. with a compass or other orientation device 32 and known antenna 16 heights) the antennas' locations can be solved in terms of each other. In other words, both antenna 16 locations can be determined in absolute coordinates of an earth-referenced location system with four unique satellites A, B, C and D. By contrast, unconstrained systems would require four satellites to be seen by each antenna for a complete position solution. FIG. 5A shows antenna measurements divided as follows: Am (A, B) and As (C, D). Any other satellite/antenna combination would also provide an attitude/position solution provided four satellites collectively are seen by the antennas 16. With eight unknowns in the position equation for two unconstrained antennas, the constraining structure 104, the time (clock) constraint orientation device collectively remove four unknowns from the solution equation, enabling positioning operation as shown in FIG. 5A. For example, a satellite-blocking object 105 on the structure 104 could comprise a crane on a marine vessel, which would otherwise seriously impede GNSS navigation.

FIG. 5B shows a similar system 102 with an unknown clock bias, i.e. independent clocks associated with separate receivers. In this case a total of five GNSS measurements are needed from four unique satellites, one of which (C1) is commonly seen by both antennas 16. FIG. 5B shows antenna measurements divided as follows: Am (A, B, C1) and As (C1, D). Any other satellite/antenna combination would also provide an attitude/position solution provided five satellites collectively are seen by the antennas 16, four unique and one common.

FIG. 5C shows a similar system 103 with common or synchronized clocks (clock constraint) and GNSS-determined attitude using additional measurements at the antennas 16 in place of an orientation device 32. In this case a total of six GNSS measurements are needed from four unique satellites, two of which (C1, C2) are commonly seen by both antennas 16. FIG. 5C shows antenna measurements divided as follows: Am (A, C1, C2) and As (B, C1, C2). Any other satellite/antenna combination would also provide an attitude/position solution provided six satellites collectively are seen by the antennas 16, four unique and two common. In this configuration four measurements provide a location for the master antenna Am and the other two measurements provide a bearing to the slave antenna As. In other words, such constraints remove two unknowns from the position/attitude solution equation enabling a complete solution from six measurements, as compared to the eight measurements required for an unconstrained system. Because of the distance/geometry/clock constraints, the six measurements can be received at the antennas 16 in various combinations.

It will be appreciated that with the systems 101, 102, 103, the common satellites could have been seen in the past and inertial navigation system (INS) devices, such as gyroscopes and/or accelerometers, could be used for guidance during GNSS signal loss. Such INS devices would be previously aligned and calibrated using GNSS-based attitude and effectively provide short-term replacement measurement input. Thus, the common measurements need not be received simultaneously. Upon GNSS signal reacquisition, the INS devices are corrected, aligned and calibrated with GNSS-defined attitude solutions. Moreover, multipath mitigation is provided by both (multiple) antennas 16 receiving measurements from the same satellites. Measurements are generally strengthened by providing more measurements, provided the antennas 16 are separated by more than a wavelength (i.e. greater than a carrier phase wavelength of 19 cm) whereby multipath will be uncorrelated and multipath errors will not accumulate linearly. Therefore, the measurement to multipath ratio will improve by approximately the square root of the number of duplicate measurements.

It will be appreciated that the satellite systems as discussed herein may include but not be limited to Wide Area Augmentation System (WAAS), Global Navigation Satellite System (GNSS) including GPS, GLONASS and other satellite ranging technologies. The term WAAS is used herein as a generic reference to all GNSS augmentation systems which, to date, include three programs: WAAS (Wide Area Augmentation System) in the USA, EGNOS (European Geostationary Navigation Overlay System) in Europe and MSAS (Multifunctional Transport Satellite Space-based Augmentation System) in Japan. Each of these three systems, which are all compatible, consists of a ground network for observing the GNSS constellation, and one or more geostationary satellites.

It will also be appreciated that while a particular series of steps or procedures is described as part of the aforementioned process, no order of steps should necessarily be inferred from the order of presentation. For example, the process includes receiving one or more sets of satellite signals. It should be evident that the order of receiving the satellite signals is variable and could be reversed without impacting the methodology disclosed herein or the scope of the claims.

It should further be appreciated that while an exemplary partitioning functionality has been provided, it should be apparent to one skilled in the art, that the partitioning could be different. For example, the control of the master receiver 12 and slave receiver 14, could be integrated in any, or another unit. The processes may, for ease of implementation, be integrated into a single unit. Such configuration variances should be considered equivalent and within the scope of the disclosure and Claims herein.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

Having thus described the invention, what is claimed as new and desired to be secured by Letters Patent is:

1. A GNSS-based method of tracking relative movement of a fixed or slow-moving structure, which method comprises the steps of:

providing a master receiver unit with a master GNSS receiver having a first clock, a master RF transmitter, and a master processor;

providing a master GNSS antenna connected to said master receiver;

providing a slave receiver unit with a slave GNSS receiver having a second clock, a slave RF receiver, a slave processor, and a temperature sensor connected to a thermocouple;

providing a slave antenna array comprising multiple slave GNSS antennas, each selectively connected to said slave receiver via an antenna switch control;

controlling the antenna switch control by the master processor;

mounting said slave GNSS antennas on the structure at fixed locations relative to each other and said structure to define distance and geometry constraints, wherein separating the antennas by a distance greater than a carrier phase wavelength of the GNSS signals, and at least a portion of the slave GNSS antennas being blocked by said structure from at least a portion of the satellites in the GNSS constellation;

synchronizing the first and second clocks;

receiving GNSS signals at each of the master GNSS antenna and the slave GNSS antennas and respectively measuring carrier phase observations therefrom, wherein at least one slave antenna receives signals from only a portion of the in-view satellites due to the structure blocking its view;

transmitting master receiver unit carrier phase observations using the master RF transmitter;

receiving said master receiver unit carrier phase observations using the slave RF receiver;

determining in the slave processor the relative locations and relative ambiguities of the multiple slave GNSS antennas using the measured carrier phase observations and the received said master receiver unit carrier phase observations;

time-tagging and storing the relative locations, relative ambiguities, and carrier phase observations;

forming single or double difference equations and solving for global ambiguities using the relative antenna locations and relative ambiguities;

compensating for ambient temperature at the slave antennas based on the temperature sensor;

measuring said GNSS signals at respective antennas at intervals corresponding to the orbital cycles of said satellites and the Earth's rotation and averaging the measured GNSS signals to reduce or eliminate multipath contributions;

computing and storing in the slave processor a position and an attitude solution for said structure at a plurality of spaced points in time; and comparing the position and attitude solution at first and second spaced points in time to provide an output representing a movement of the structure.

2. The method of claim 1 wherein the slave processor is programmed with a temperature look-up table to compensate for ambient temperature with input from said temperature sensor.

* * * * *